United States Patent
Willems et al.

(10) Patent No.: US 6,462,132 B2
(45) Date of Patent: Oct. 8, 2002

(54) THERMOPLASTIC ELASTOMER COMPOSITION AND MOLDED ARTICLES MADE THEREOF

(75) Inventors: Edwin Willems, Sittard (NL); Mohammad R. Sadeghi, Leominster, MA (US)

(73) Assignee: DSM N.V., Heelen (NL)

(*) Notice: Subject to any disclaimer, the term of this patent is extended or adjusted under 35 U.S.C. 154(b) by 0 days.

(21) Appl. No.: 09/756,290

(22) Filed: Jan. 9, 2001

(65) Prior Publication Data

US 2002/0132920 A1 Sep. 19, 2002

(51) Int. Cl.[7] .......................... C08L 67/00; C08L 71/00
(52) U.S. Cl. .................. 525/88; 525/92 D; 525/92 E; 525/92 F; 525/92 L; 525/92 A
(58) Field of Search ................... 525/63, 92 R, 525/92 A, 92 D, 92 E, 92 F, 92 L

(56) References Cited

U.S. PATENT DOCUMENTS 4,154,789 A * 5/1979 Delacoste .................. 264/138
5,145,402 A * 9/1992 Plyler et al. ................ 439/719
6,066,697 A * 5/2000 Coran et al. ............... 525/193

\* cited by examiner

*Primary Examiner*—Jeffrey Mullis
(74) *Attorney, Agent, or Firm*—Pillsbury Winthrop LLP

(57) ABSTRACT

The subject invention relates to a thermoplastic elastomer composition that contains a dynamically vulcanized thermoplastic elastomer (a) on the basis of a thermoplastic polyolefin and an at least partly dynamically vulcanized rubber, a thermoplastic polyester block copolymer (b) and a compatibilizer (c). The thermoplastic polyolefin is preferably a propylene homo- or copolymer. The rubber is preferably an EPDM or EPM copolymer. The thermoplastic polyester block copolymer is preferably a polyether ester block copolymer. The thermoplastic elastomer composition according to the invention for instance contains 20–80 parts (a), 80–20 parts (b), and 1–40 parts (c), the sum of the parts (a+b+c) being 100. The thermoplastic elastomer composition according to the invention also relates to molded articles that contains the thermoplastic elastomer composition.

12 Claims, No Drawings

THERMOPLASTIC ELASTOMER COMPOSITION AND MOLDED ARTICLES MADE THEREOF

The invention relates to a thermoplastic elastomer composition and molded parts thereof.

A thermoplastic elastomer composition is known inter alia from Polymer Blends, Volume 2: Performance, edited by D. R. Paul and C. B. Sucknall, ISBN 0-471-36280-2, 2000. This article describes thermoplastic elastomers on the basis of a thermoplastic polymer and a dynamically vulcanized rubber which is dispersed in a continuous phase of the thermoplastic polymer in the form of fine particles. Such thermoplastic elastomers, thermoplastic vulcanisates, hereinafter called (TPV's), possess a number of properties of an elastomer and can be processed among other things as a thermoplastic polymer The most widely used TPV's have a polyolefin as thermoplastic polymer. As a consequence, these TPV's adhere only to apolar substrates and they do not adhere, or only with difficulty, to polar substrates. To improve the adhesion, the substrate is often pretreated. Industrially used pretreatment methods are dependent on the substrate and may for instance be chromic acid etching. ozone treatment, UV irradiation, primer coatings or plasma treatment. However, these pretreatments are expensive, use hazardous substances, result in product degradation and involve environmental risks.

The aim of the present invention is to provide a thermoplastic elastomer composition that exhibits intrinsically good adhesion to polar and apolar substrates while it does not have the above-mentioned disadvantages.

This aim is achieved according to the invention with a thermoplastic elastomer composition that contains a blend of:
  a. a dynamically vulcanized thermoplastic elastomer containing a thermoplastic polyolefin and an at least partly dynamically vulcanized rubber
  b. a thermoplastic polyester block copolymer
  c. a compatibilizer.

It has, surprisingly, been found that the thermoplastic elastomer composition according to the invention exhibits particular good adhesion to apolar but in particular also to polar substrates, it being possible to leave out the pretreatment of the substrate.

A further advantage is that a thermoplastic elastomer composition is obtained with a relatively low hardness and good mechanical properties.

Examples of suitable thermoplastic polyolefins used in the thermoplastic elastomer composition according to the invention are thermoplastic semi-crystalline polyolefin homo- and copolymers or blends thereof. Examples of these are homopolymers of ethylene or propylene, copolymers of ethylene and propylene, copolymers of ethylene and an alpha-olefin with 4–12 carbon atoms or copolymers of propylene and an alpha-olefin with 4–12 carbon atoms, It is essential that the ethylene or propylene content in the copolymers is so high that the copolymer is semi-crystalline. In the case of statistic copolymers this is usually achieved at an ethylene or propylene content of about 70 mol % or more. Preferably, a homopolymer of propylene is used.

Examples of rubbers that can be used in the thermoplastic elastomer composition according to the invention are rubbers that are suitable for dynamic vulcanization. Examples of such rubbers are ethylene-propylene copolymers, hereinafter called EPM, ethylenlpropylene-dione terpolymers, hereinafter called EPDM, styrene butadiene rubber, nitrile butadiene rubber, isobutene-isoprene rubber, styreneethylene/styrene-butadiene block copolymers, butyl rubber, isobutylene-p-methylstyrene copolymers or brominated Isobutylene-p-methylstyrene copolymers. natural rubber or blends of these. Preferably, EPDM or EPM is used as rubber. Mast preferably, EPDM is used as rubber. The EPDM preferably contains 50–70 parts by weight ethylene monomer units, 48–30 parts by weight monomer units originating from an alpha-olefin and 2–12 parts by weight monomer units originating from a non-conjugated diene. As alphaolefin use is preferably made of propylene. As nonconjugated diene use is preferably made of dicyclopentadiene (DCPD), 5-ethylidene-2-norbornene (ENB) or vinylnorbornene (VNB).

The dynamic vulcanization of the rubber is carried out in the presence of a suitable vulcanization agent such as, for instance, sulfur, sulfurous compounds, metal oxides, maleimides, phenol resins or peroxides. These vulcanization systems are known from the state of the art and are described in U.S. Pat. No. 5,100,947, It is also possible to use siloxane compounds as vulcanization agent, examples are hydrositane or vinylalkoxysilane. The thermoplastic elastomer composition according to the invention is preferably vulcanized with the aid of phenol resins, siloxanes or peroxides as vulcanization agent. The degree of vulcanization can be expressed in terms of gel content This method is described in U.S. Pat. No. 5,100,947.

The rubber in the thermoplastic elastomer composition according to the invention is at least partly vulcanized and for instance has a gel content between 60 and 100%. More preferably, the rubber has a gel content between 80 and 100%. Most preferably, the rubber is fully vulcanized and has a gel content in excess of 95%.

The polyester block copolymer used in the thermoplastic elastomer composition according to the invention preferably consists of soft blocks of a flexible polymer segment and hard blocks of a non flexible polymer segment.

The soft blocks of the flexible polymer segments for instance have a molecular mass of 400–6000 g/mol; preferably they have a molecular mass of 500–3000 g/mol. Examples of soft blocks are aliphatic polyether segments or aliphatic polyester segments. Examples of aliphatic polyester segments are polybutylene adipate segments or polycaprolactone segments. Examples of aliphatic polyether segments are polyalkylene-oxide glycol segments such as for instance polyethylene-oxide glycol segments, polypropylene-oxide glycol segment, polytetramethyleneoxide glycol segments or ethylene oxide-terminated polypropylene-oxide glycol segments.

Preferably, an aliphatic polyether segment is used as soft block in the polyester block copolymer. More preferably, ethylene oxide-terminated polypropyleneoxide glycol segments or polytetramethylene-oxide glycol segments are used.

The hard blocks in the polyester block copolymer preferably consist of repeating units of at least one alkylene glycol and at least one aromatic clicarboxylic acid or an ester thereof. The alkylene group generally contains 2–6 carbon atoms, preferably 2–4 carbon atoms. Examples are ethylene glycol, propylene glycol or butylene glycol. Preferably, use is made of propylene glycol or butylene glycol. More preferably, use is made of butylene glycol. Examples of aromatic dicarboxylic acids are terephthalic acid, isophthalic acid, 1,4-naphthalene dicarboxylic acid or 4,4'-diphenyl dicarboxylic acid. Examples of the hard polyester blocks are polyethylene terephthalate segments, polypropylene terephthalate segments or polybutylene terephthalate segments. Preferably, polybutylene terephthalate segments are used as hard polyester block.

The ratio between the soft and hard blocks in the polyester block copolymer can generally vary within wide limits, but is chosen in particular in light of the desired hardness of the polyester block copolymer. The hardness may generally vary between 20 and 80 Shore D.

Most preferably. the polyester block copolymer is a block copolymer with hard blocks derived from polybutylene terephthalate segments and soft blocks derived from polytetramethylene-oxide glycol segments or ethylene oxide-terminated polypropylene-oxide glycol segments.

The polyester block copolymer may further contain the customary additives such as stabilizers, colorants, processing aids or flame-retarding compounds. Examples and the preparation of polyester block copolymers are described inter alia in Handbook of Thermoplastics, ed. O. Olabishi, Chapter 17, Marcel Dekker Inc., New York 1997, ISBN 0-8247-9797-3. in Thermoplastic Elastomers, 2nd Ed, Chapter 8, Carl Hanser Verlag (1996) ISBN 1-56990-205-4, and in Encyclopedia of Polymer Science and Engineering, Vol. 12, Wiley & Sons, New York (1988), ISBN 0-471-80944. pp. 75–117 and the references given there The compatibilizer (c) in the thermoplastic elastomer composition according to the invention is compatible with both the dynamically vulcanized thermoplastic elastomer (a) and the thermoplastic polyester block copolymer (b).

Compatibilizers that can be used in the thermoplastic elastomer composition according to the invention are functionalized polymers such as for instance epoxy or acid functionalized polymers. Preferably the epoxy or acid functionalized polymers are epoxy or acid functionalized olefine polymers. Examples of epoxy functionalized olefine polymers are copolymers of ethylene-glyciclyl methacrylate or ethylene-glycidyl scrylate or terpolymers of ethylene-glycidyl methacrylate acrylate or glycidyl methacrylate functionalized polyethylene or glycidyl methacylate functionalized acrylate terpolymers. Examples of acid functionalized olefine polymers are maleic anhydride functionalized olefine polymers such as maleic anhydride functionalized polypropylene or maleic anhydride functionalized polyethylene. Preferably, an epoxy functionalized olefin polymer is used as compatibilizer in the thermoplastic composition according to the invention.

The thermoplastic elastomer composition according to the invention for instance contains 20–80 parts (a), 80–20 parts (b) and 1–40 parts (c) the sum of the parts (a+b+c) being 100.

Preferably, the thermoplastic elastomer composition according to the invention contains 30–70 parts (a), 70–30 parts (b) and 5–20 parts (c), the sum of the parts of (a+b+c) being 100.

The thermoplastic elastomer composition according to the invention optionally contains other customary additives. Examples of such additives are reinforcing and non-reinforcing fillers, plasticizers, antioxidants, stabilizers, oil, antistatic agents, waxes, foaming agents, pigments, flame retardants and other known agents and are described in the Rubber World Magazine Blue Book, and in Gaether et al., Plastics Additives Handbook, (Hanser 1990). Examples of fillers that can be used are calcium carbonate, clay, silica, talc, titanium dioxide, and carbon. Examples of oil that can be added are paraffinic oil, naphthenic oil or aromatic oil obtained from petroleum fractions. Another additive that can optionally be added to the thermoplastic composition according to the invention is a Lewis base such as for instance a metal oxide, a metal hydroxide, a metal carbonate or hydrotaicite.

The additives can be added during the preparation of the TPV or during the preparation of the thermoplastic elastomer composition according to the invention or during both. The quantity of additive to be added is known to one skilled in the art.

The thermoplastic elastomer composition can be prepared via two successive steps but can also be prepared In one step. If the thermoplastic elastomer composition is prepared in two successive steps, in a first step the TPV will be prepared by blending the thermoplastic olefinic polymer, the rubber and other additives customarily employed by one skilled in the art in for instance a Brabender blender. After these components have been properly dispersed, the vulcanization agent is added to initiate the dynamic vulcanization. This blend results in a TPV. In a second step the TPV is introduced into an extruder and blended with the polyester block copolymer and the compatibilizer. These two steps can be carried out independently as separate steps or sequentially in the same equipment. It is also possible for the thermoplastic elastomer composition according to the invention to be prepared in a single step, with the TPV, the polyester block copolymer and the compatibilizer being introduced simultaneously into the extruder and be blended further with the additives customarily employed by one skilled in the art. It is also possible to prepare a TPV in a first step, which Is subsequently blended with a compatibilizer in the same extruder. Next, the resulting TPV masterbatch can be blended with the polyester block copolymer.

The thermoplastic elastomer composition according to the invention can for instance be blended with one or more polymers chosen from styrene-butadiene-styrene rubber (SBS), styrene-ethylene/styrene-butadiene block copolymers (SEES). styrene-propylene-styrene terpolymers (SPS), styrenes isopropylene-styrene terpolymers (SIPS), polyvinyl chloride, polycarbonate, acrylonitrile-butadienestyrene terpolymers, polybutylene terephthalate, polypropylene, styrene-acrylonitrile copolymers, styrenemalsic anhydride copolymers, polyphenylene oxide, or polyethylene. This for instance involves adding 1–40 parts of the above-mentioned polymers relative to the parts of the total composition (a+b+c). Preferably, 1–20 parts of the above-mentioned polymers are added relative to the parts of the total composition (a+b+c).

The invention also relates to molded articles that contain the thermoplastic elastomer composition according to the invention. The invention particularly relates to moulded articles comprising a substrate part and a part that comprises the thermoplastic elastomer according to the invention whereby the parts are being adhered. It has been found that the thermoplastic elastomer composition according to the invention exhibits particularly good adhesion to both polar and apolar substrates. Preferably, the adhesion between the thermoplastic elastomer composition according to the invention and the substrate is such that cohesive failure takes place, both when the substrate is polar and when it is apolar. Cohesive failure takes place when the adhesion between the thermoplastic elastomer composition according to the invention and the substrate is stronger than the thermoplastic elastomer composition.

The molded articles can be prepared using processing methods customarily employed by one skilled in the art, examples being co-extrusion, blow molding of two or more components. injection molding of two or more components, robotic extrusion, or injection overmolding.

The thermoplastic elastomer composition according to the invention can for instance be used in door profiles, wire & cables, hoses, dashboard films, window encapsulation and soft touch grips.

The invention will be elucidated with reference to the following examples, without being limited thereto.

The materials used In the examples are the following:
Arnitel™ DM400 (38 Shore D copolyether aster, DSM)
Arnitel™ EM550 (55 Shore D copolyether ester, DSM)
Arnitel™ EM630 (63 Shore D copolyether ester, DSM)
TPV40 (40 Shore A PP-EPDM-oil TPV)
Lotader™ AX8840 (GMA functionalized PE, Elf Atochem)
Lotader™ AX8860 (terpolymer of ethylene, acrylic ester and glycidyl methacrylate
(GMA), Elf Atochem)
Lotader™ AX8930 (GMA functionalized acrylate terpolymer, Elf Atochem)

The measurements in the examples were carried out using the following tests:

Hardness DIN 53505
Mechanical properties ISO 37
Compression set ISO 815

EXAMPLE 1

TPV40 is produced by melt blending 45% EPDM, 10% PP, 35% paraffinic oil, 0.5% phenolic resin, 0.5% stannous chloride and 0.5% stabilizer on a 40 mm co-rotating twin screw extruder at a melt temperature of 250° C.

In a second step the thermoplastic elastomer composition is produced by melt blending the TPV40 with a copolyether ester (Arnitel™ EM400) and an epoxy functionalized compatibilizer (Lotader™ 8860) on a 30 mm co-rotating twin screw extruder at a melt temperature of 230° C.

The adhesion properties are tested by co-extruding 1 mm strip of the thermoplastic elastomer composition on top of different substrates (2 mm of polycarbonate, ABS and polypropylene) at a temperature of 220° C. The adhesion after co-extrusion is evaluated by ranking the peel strength and is classified as either no, poor or strong adhesion and the type of failure is classified as either adhesive or cohesive.

The mechanical properties and adhesion results are shown in table 1.

COMPARATIVE EXAMPLE A

The same procedure as in example 1 is followed but instead of an epoxy functionalized compatibilizer no compatibilizer is used. The mechanical properties and adhesion results are shown in table 1.

COMPARATIVE EXAMPLE B

The same procedure as in example 1 is followed but no copolyether ester is added. The mechanical properties and adhesion results are shown in table 1.

COMPARATIVE EXAMPLE C

The same procedure as in example 1 is followed but no TPV-40 is added.
The mechanical properties and adhesion results are shown in table 1.

TABLE 1

|  | A | B | C | 1 |
|---|---|---|---|---|
| Composition |  |  |  |  |
| Arnitel ™ EM400 | 50% |  | 90% | 50% |
| TPV-40 | 50% | 90% |  | 40% |
| Lotader ™ AX8860 |  | 10% | 10% | 10% |
| Mechanical properties |  |  |  |  |
| Hardness [Shore A] | 75 | 41 | 96 | 75 |
| Tensile strength [Mpa] | 1.3 | 3.9 | 14.1 | 6.5 |
| Elongation [%] | 95 | 310 | 510 | 330 |
| Adhesion onto PC | Poor | No | Strong | Strong |
| Type of failure | Adhesive | Adhesive | Cohesive | Cohesive |
| Adhesion onto ABS | Poor | No | Strong | Strong |
| Type of failure | Adhesive | Adhesive | Cohesive | Cohesive |
| Adhesion onto PP | Poor | Strong | No | Strong |
| Type of failure | Adhesive | Cohesive | Adhesive | Cohesive |

From table 1 it is clear that in comparative examples A, B and C there is no or poor adhesion to polar and apolar substrates. The type of failure is in most cases adhesive instead of cohesive. In example 1 very good adhesion to polar and apolar substrates was found, while the type of failure was cohesive in every case.

EXAMPLES 2 to 6

TPV40 is produced by melt blending 45% EPOM, 10% PP, 35% paraffinic oil, 0.5% phenolic resin, 0.5% stannous chloride and 0.5% stabilizer on a 40 mm co-rotating twin screw extruder at a melt temperature of 250° C. In the same extrusion step the copolyether ester (Arnitel™ EM400) and an epoxy functionalized compatibilizer (Lotader™ AX8930) are added in different concentrations.

The adhesion properties are tested by injection molding 30×30×2 mm plaques of the thermoplastic elastomer composition against the small side of 30×30×2 mm plaques of different substrates (polycarbonate, ABS and polypropylene) at a temperature of 240° C. The final part is 60×60×2 mm. The adhesion after injection molding is evaluated by cutting test bars across the interface and measuring the mechanical strength of the 2K test bar. Besides the adhesion strength, the type of failure is classified as either adhesive or cohesive.

The mechanical and adhesion properties are shown in table 2.

TABLE 2

|  | 2 | 3 | 4 | 5 | 6 |
|---|---|---|---|---|---|
| Composition |  |  |  |  |  |
| Arnitel ™ EM400 | 60 | 50 | 40 | 30 | 20 |
| TPV-40 | 25 | 35 | 45 | 50 | 60 |
| Lotader ™ AX8930 | 15 | 15 | 15 | 20 | 20 |
| Mechanical properties |  |  |  |  |  |
| Hardness [Shore A] | 80 | 75 | 68 | 63 | 55 |
| Tensile strength [Mpa] | 7.9 | 6.7 | 5.0 | 4.7 | 4.0 |
| Elongation [%] | 490 | 375 | 280 | 200 | 180 |
| C. set 72h/23° C. [%] | 29 | 30 | 30 | 31 | 31 |
| C. set 22h/70° C. [%] | 46 | 48 | 51 | 48 | 45 |
| Adhesion to PC [Mpa] | 5.9 | 5.0 | 3.7 | 3.4 | 2.9 |
| Type of failure | Cohesive | Cohesive | Cohesive | Cohesive | Cohesive |
| Adhesion to ABS [Mpa] | 5.1 | 4.3 | 3.1 | 2.8 | 2.1 |
| Type of failure | Cohesive | Cohesive | Cohesive | Cohesive | Cohesive |
| Adhesion to PP [Mpa] | 5.6 | 4.9 | 3.8 | 3.7 | 3.1 |
| Type of failure | Cohesive | Cohesive | Cohesive | Cohesive | Cohesive |

Table 2 shows that the use of a larger amount of Arnitel™ EM400 in the thermoplastic elastomer composition according to the invention results in stronger adhesion to both the polar and the apolar substrates. In all the type of failure is cohesive.

EXAMPLES 7 to 9

TPV40 is produced by melt blending 45% EPDM, 10% PP, 35% paraffinic oil. 0.5% phenolic resin, 0.5% stannous chloride and 0.5% stabilizer on a 40 mm co-rotating twin screw extruder at a melt temperature of 250° C. In the same extrusion step the epoxy functionalized compatibilizer (Lotader™ AX8930) is added.

In a second step the thermoplastic elastomer composition is produced by melt blending TPV-40 (including an epoxy functionalized compatibilizer, Lotader™ AX8840) with different copolyether esters (Arnitel™ EM400, EM550, EM630) on a 30 mm co-rotating twin screw extruder at a melt temperature of 230° C.

The adhesion properties are tested by injection molding 2 mm plaques of the thermoplastic elastomer composition against 2 mm plaques of different substrates (polycarbonate, ABS, polypropylene, Arnitel™ EM 550 and polybutylene terephthalate) at a temperature of 240° C. The adhesion after injection molding is classified as no, poor or strong adhesion. In addition, the type of failure is classified as either adhesive or cohesive.

The mechanical and adhesion properties are shown in table 3.

TABLE 3

|  | 7 | 8 | 9 |
|---|---|---|---|
| Composition |  |  |  |
| Arnitel ™ EM400 | 50 |  |  |
| Arnitel ™ EM550 |  | 50 |  |
| Arnitel ™ EM630 |  |  | 50 |
| TPV-40 | 40 | 40 | 40 |
| Lotader ™ AX8930 | 10 | 10 | 10 |
| Mechanical properties |  |  |  |
| Hardness [Shore A] | 75 | 86 | 93 |
| Tensile strength [Mpa] | 4.9 | 5.8 | 7.0 |
| Elongation [%] | 370 | 300 | 220 |
| Adhesion to PC | Strong | Strong | Strong |
| Type of failure | Cohesive | Cohesive | Cohesive |
| Adhesion to ABS | Strong | Strong | Strong |
| Type of failure | Cohesive | Cohesive | Cohesive |
| Adhesion to PBT | Strong | Strong | Strong |
| Type of failure | Cohesive | Cohesive | Cohesive |
| Adhesion to Arnitel ™ EM550 | Strong | Strong | Strong |
| Type of failure | Cohesive | Cohesive | Cohesive |
| Adhesion to PP | Strong | Strong | Strong |
| Type of failure | Cohesive | Cohesive | Cohesive |

Table 3 shows that the mechanical properties are influenced by the use of different types of Arnitel™. The adhesion properties, however, are strong for all the substrates. In all cases cohesive adhesion is obtained.

What is claimed is:

1. Thermoplastic elastomer composition comprising,
   a. i. a dynamically vulcanized thermoplastic elastomer containing a thermoplastic olefin homopolymer or copolymer of an olefin selected from the group consisting of ethylene and propylene and
   ii. an at least partly dynamically vulcanized rubber;
   b. a thermoplastic polyester block copolymer; and
   c. a compatibilizer.

2. Thermoplastic elastomer composition according to claim 1, wherein the blend contains 20–80 parts (a), 80–20 parts (b) and 1–40 parts (c), the sum of parts (a+b+c) being 100.

3. Thermoplastic elastomer composition according to claim 1, wherein the blend contains 30–70 parts (a), 70–30 parts (b) and 5–20 parts (c), the sum of parts (a+b+c) being 100.

4. Thermoplastic elastomer composition according to claim 1, wherein the rubber is an EPDM or EPM copolymer.

5. Thermoplastic elastomer composition according to claim 1, wherein the at least partly dynamically vulcanized rubber has a gel content that is higher than 80%.

6. Thermoplastic elastomer composition according to claim 5, wherein the at least partly dynamically vulcanized rubber has a gel content that is higher than 95%.

7. Thermoplastic elastomer composition according to claim 1, wherein the thermoplastic polyester block copolymer is a polyether ester block copolymer.

8. Thermoplastic elastomer composition according to claim 1, wherein the compatibilizer is a functionalized polymer.

9. Thermoplastic elastomer composition according to claim 8, wherein the functionalized polymer is an epoxy or acid functionalized polymer.

10. Thermoplastic elastomer composition according to claim 9, wherein the epoxy functionalized polymer is an epoxy-functionalized olefin polymer.

11. Molded article comprising the thermoplastic elastomer composition according to any one of claims 1–3 or 4–10.

12. Molded article comprising a substrate part and a part that comprises the thermoplastic elastomer composition according to any one of claims 1–3 or 4–10 wherein the parts are adhered to each other.

* * * * *